(12) United States Patent
Meiri et al.

(10) Patent No.: US 10,719,257 B1
(45) Date of Patent: Jul. 21, 2020

(54) TIME-TO-LIVE (TTL) LICENSE MANAGEMENT IN AN ACTIVE/ACTIVE REPLICATION SESSION

(71) Applicant: EMC IP Holding Company LLC, Hopkinton, MA (US)

(72) Inventors: David Meiri, Somerville, MA (US); Anton Kucherov, Dudley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/396,880

(22) Filed: Apr. 29, 2019

(51) Int. Cl.
*G06F 3/06* (2006.01)
*H04L 29/08* (2006.01)
*G06F 9/455* (2018.01)

(52) U.S. Cl.
CPC ............ *G06F 3/065* (2013.01); *G06F 3/0617* (2013.01); *G06F 3/0664* (2013.01); *G06F 3/0674* (2013.01); *G06F 9/45558* (2013.01); *H04L 67/14* (2013.01); *G06F 2009/45583* (2013.01)

(58) Field of Classification Search
CPC ...... G06F 3/065; G06F 3/0674; G06F 3/0617; G06F 9/45558; G06F 3/0664; G06F 2009/45583; H04L 67/14
See application file for complete search history.

(56) References Cited

U.S. PATENT DOCUMENTS

| | | |
|---|---|---|
| 3,799,601 A | 3/1974 | Johansson et al. |
| 5,913,213 A | 6/1999 | Wikström et al. |
| 6,253,274 B1 | 6/2001 | Boonie et al. |
| 6,496,908 B1 | 12/2002 | Kamvysselis et al. |
| 6,553,464 B1 | 4/2003 | Kamvysselis et al. |
| 6,640,280 B1 | 10/2003 | Kamvysselis et al. |
| 6,862,632 B1 | 3/2005 | Halstead et al. |
| 6,883,018 B1 | 4/2005 | Meiri et al. |
| 6,886,164 B2 | 4/2005 | Meiri |
| 6,898,685 B2 | 5/2005 | Meiri et al. |

(Continued)

OTHER PUBLICATIONS

Non-Final Office Action dated Feb. 5, 2020, U.S. Appl. No. 16/263,414, 22 pages.

(Continued)

*Primary Examiner* — Francisco A Grullon
(74) *Attorney, Agent, or Firm* — Daly, Crowley, Mofford & Durkee, LLP

(57) ABSTRACT

Implementing time-to-live (TTL) license management in an active/active (A/A) replication session is provided. In one aspect, a first host is assigned as a replication session manager, and is tasked with performing A/A replication management functions. The functions include granting a TTL license to a first and second storage array, providing IO requests to the arrays during a lifespan of the TTL license, and upon determining a communication failure occurred between the arrays, selecting one of the arrays as a winner and another as a loser; suspending the TTL license to the loser; and notifying the winner to suspend replication to the loser. Another aspect includes monitoring, by a second host, a communication connection between the first and second hosts. An aspect also includes upon determining the communication connection has failed between the first second hosts, reassigning the second host as the replication session manager to take over the management functions.

20 Claims, 6 Drawing Sheets

(56) References Cited

U.S. PATENT DOCUMENTS

| | | |
|---|---|---|
| 6,910,075 B2 | 6/2005 | Marshak et al. |
| 6,938,122 B2 | 8/2005 | Meiri et al. |
| 6,944,726 B2 | 9/2005 | Yoder et al. |
| 6,968,369 B2 | 11/2005 | Veprinsky et al. |
| 6,976,139 B2 | 12/2005 | Halstead et al. |
| 7,000,086 B2 | 2/2006 | Meiri et al. |
| 7,024,525 B2 | 4/2006 | Yoder et al. |
| 7,032,228 B1 | 4/2006 | McGillis et al. |
| 7,051,176 B2 | 5/2006 | Meiri et al. |
| 7,054,883 B2 | 5/2006 | Meiri et al. |
| 7,113,945 B1 | 9/2006 | Moreshet et al. |
| 7,114,033 B2 | 9/2006 | Longinov et al. |
| 7,174,423 B2 | 2/2007 | Meiri et al. |
| 7,197,616 B2 | 3/2007 | Meiri et al. |
| 7,228,456 B2 | 6/2007 | Lecrone et al. |
| 7,240,116 B2 | 7/2007 | Marshak et al. |
| 7,292,969 B1 | 11/2007 | Aharoni et al. |
| 7,376,651 B2 | 5/2008 | Moreshet et al. |
| 7,380,082 B2 | 5/2008 | Meiri et al. |
| 7,383,385 B2 | 6/2008 | Meiri et al. |
| 7,383,408 B2 | 6/2008 | Meiri et al. |
| 7,386,668 B2 | 6/2008 | Longinov et al. |
| 7,392,360 B1 | 6/2008 | Aharoni et al. |
| 7,409,470 B2 | 8/2008 | Halstead et al. |
| 7,430,589 B2 | 9/2008 | Veprinsky et al. |
| 7,475,124 B2 | 1/2009 | Jiang et al. |
| 7,577,957 B1 | 8/2009 | Kamvysselis et al. |
| 7,613,890 B1 | 11/2009 | Meiri |
| 7,617,372 B1 | 11/2009 | Bjornsson et al. |
| 7,702,871 B1 | 4/2010 | Arnon et al. |
| 7,870,195 B1 | 1/2011 | Meiri |
| 8,046,545 B2 | 10/2011 | Meiri et al. |
| 8,078,813 B2 | 12/2011 | LeCrone et al. |
| 8,327,103 B1 | 12/2012 | Can et al. |
| 8,332,687 B1 | 12/2012 | Natanzon et al. |
| 8,335,771 B1 | 12/2012 | Natanzon et al. |
| 8,335,899 B1 | 12/2012 | Meiri et al. |
| 8,380,928 B1 | 2/2013 | Chen et al. |
| 8,429,346 B1 | 4/2013 | Chen et al. |
| 8,468,180 B1 | 6/2013 | Meiri et al. |
| 8,515,911 B1 | 8/2013 | Zhou et al. |
| 8,538,148 B2 | 9/2013 | Zhou et al. |
| 8,566,483 B1 | 10/2013 | Chen et al. |
| 8,578,204 B1 | 11/2013 | Ortenberg et al. |
| 8,583,607 B1 | 11/2013 | Chen et al. |
| 8,600,943 B1 | 12/2013 | Fitzgerald et al. |
| 8,677,087 B2 | 3/2014 | Meiri et al. |
| 8,683,153 B1 | 3/2014 | Long et al. |
| 8,694,700 B1 | 4/2014 | Natanzon et al. |
| 8,706,959 B1 | 4/2014 | Arnon et al. |
| 8,712,976 B1 | 4/2014 | Chen et al. |
| 8,719,497 B1 | 5/2014 | Don et al. |
| 8,732,124 B1 | 5/2014 | Arnon et al. |
| 8,775,388 B1 | 7/2014 | Chen et al. |
| 8,782,324 B1 | 7/2014 | Chen et al. |
| 8,782,357 B2 | 7/2014 | Halstead et al. |
| 8,799,601 B1 | 8/2014 | Chen et al. |
| 8,812,595 B2 | 8/2014 | Meiri et al. |
| 8,825,964 B1 | 9/2014 | Sopka et al. |
| 8,838,849 B1 | 9/2014 | Meiri et al. |
| 8,862,546 B1 | 10/2014 | Natanzon et al. |
| 8,909,887 B1 | 12/2014 | Armangau et al. |
| 8,914,596 B2 | 12/2014 | Lecrone et al. |
| 8,930,746 B1 | 1/2015 | Chen et al. |
| 8,954,699 B1 | 2/2015 | Chen et al. |
| 8,966,211 B1 | 2/2015 | Arnon et al. |
| 8,977,812 B1 | 3/2015 | Chen et al. |
| 8,977,826 B1 | 3/2015 | Meiri et al. |
| 9,002,904 B1 | 4/2015 | Meiri et al. |
| 9,009,437 B1 | 4/2015 | Bjornsson et al. |
| 9,026,492 B1 | 5/2015 | Shorey et al. |
| 9,026,696 B1 | 5/2015 | Natanzon et al. |
| 9,037,816 B1 | 5/2015 | Halstead et al. |
| 9,037,822 B1 | 5/2015 | Meiri et al. |
| 9,100,343 B1 | 8/2015 | Riordan et al. |
| 9,110,893 B2 | 8/2015 | Mein et al. |
| 9,152,336 B1 | 10/2015 | Chen et al. |
| 9,304,889 B1 | 4/2016 | Chen et al. |
| 9,323,750 B2 | 4/2016 | Natanzon et al. |
| 9,342,465 B1 | 5/2016 | Meiri |
| 9,355,112 B1 | 5/2016 | Armangau et al. |
| 9,378,106 B1 | 6/2016 | Ben-Moshe et al. |
| 9,384,206 B1 | 7/2016 | Bono et al. |
| 9,395,937 B1 | 7/2016 | Si et al. |
| 9,396,243 B1 | 7/2016 | Halevi et al. |
| 9,418,131 B1 | 8/2016 | Halevi et al. |
| 9,449,011 B1 | 9/2016 | Chen et al. |
| 9,459,809 B1 | 10/2016 | Chen et al. |
| 9,460,102 B1 | 10/2016 | Bono et al. |
| 9,477,431 B1 | 10/2016 | Chen et al. |
| 9,483,355 B1 | 11/2016 | Meiri et al. |
| 9,513,814 B1 | 12/2016 | Can et al. |
| 9,524,220 B1 | 12/2016 | Veprinsky et al. |
| 9,529,545 B1 | 12/2016 | Bono et al. |
| 9,542,125 B1 | 1/2017 | Chen |
| 9,558,083 B2 | 1/2017 | LeCrone et al. |
| 9,594,514 B1 | 3/2017 | Bono et al. |
| 9,606,739 B1 | 3/2017 | LeCrone et al. |
| 9,606,870 B1 | 3/2017 | Meiri et al. |
| 9,684,593 B1 | 6/2017 | Chen et al. |
| 9,710,187 B1 | 7/2017 | Si et al. |
| 9,753,663 B1 | 9/2017 | LeCrone et al. |
| 9,811,288 B1 | 11/2017 | Chen et al. |
| 9,817,766 B1 | 11/2017 | Si et al. |
| 9,933,947 B1 | 4/2018 | Vokaliga et al. |
| 9,959,063 B1 | 5/2018 | Meiri et al. |
| 9,959,073 B1 | 5/2018 | Meiri |
| 10,007,466 B1 | 6/2018 | Meiri et al. |
| 10,025,843 B1 | 7/2018 | Meiri et al. |
| 10,037,369 B1 | 7/2018 | Bono et al. |
| 10,055,161 B1 | 8/2018 | Meiri et al. |
| 10,082,959 B1 | 9/2018 | Chen et al. |
| 10,095,428 B1 | 10/2018 | Meiri et al. |
| 10,152,381 B1 | 12/2018 | Shvaiger et al. |
| 10,152,527 B1 | 12/2018 | Meiri et al. |
| 10,176,046 B1 | 1/2019 | Hu et al. |
| 10,235,066 B1 | 3/2019 | Chen et al. |
| 10,238,487 B2 | 3/2019 | Alon et al. |
| 10,261,853 B1 | 4/2019 | Chen et al. |
| 10,417,056 B2 | 9/2019 | Dice |
| 2008/0288811 A1 | 11/2008 | Sudhakar |
| 2009/0265352 A1 | 10/2009 | Holenstein et al. |
| 2010/0191884 A1 | 7/2010 | Holenstein et al. |
| 2011/0137879 A1 | 6/2011 | Dubey et al. |
| 2016/0098330 A1* | 4/2016 | Mu .................. G06F 3/0619 714/6.23 |
| 2017/0039094 A1 | 2/2017 | Dice |
| 2017/0193070 A1 | 7/2017 | Miller et al. |
| 2017/0300668 A1* | 10/2017 | Bawa .................. G06F 21/105 |
| 2018/0260125 A1* | 9/2018 | Botes .................. G06F 3/0617 |

OTHER PUBLICATIONS

U.S. Appl. No. 16/398,595, filed Apr. 30, 2019, Kucherov et al.
U.S. Appl. No. 16/395,595, filed Apr. 26, 2019, Meiri et al.
U.S. Appl. No. 16/264,982, filed Feb. 1, 2019, Chen et al.
U.S. Appl. No. 16/264,825, filed Feb. 1, 2019, Chen et al.
U.S. Appl. No. 16/263,414, filed Jan. 31, 2019, Meiri et al.
U.S. Appl. No. 16/254,899, filed Jan. 23, 2019, Chen et al.
U.S. Appl. No. 16/177,782, filed Nov. 1, 2018, Hu et al.
U.S. Appl. No. 16/175,979, filed Oct. 31, 2018, Hu et al.
U.S. Appl. No. 16/169,202, filed Oct, 24, 2018, Chen et al.
U.S. Appl. No. 16/167,858, filed Oct. 23, 2018, Chen et al.
U.S. Appl. No. 16/164,005, filed Oct. 18, 2018, Chen et al.
U.S. Appl. No. 16/162,786, filed Oct. 17, 2018, Hu et al.
U.S. Appl. No. 16,157,528, filed Oct. 11, 2018, Chen et al.
U.S. Appl. No. 16/050,247, filed Jul. 31, 2018, Schneider et al.
U.S. Appl. No. 16/048,767, filed Jul. 30, 2018, Chen et al.
U.S. Appl. No. 16/042,363, filed Jul. 23, 2018, Chen et al.
U.S. Appl. No. 16/038,543, filed Jul. 18, 2016, Chen et al.
U.S. Appl. No. 15/971,445, filed May 4, 2018, Kucherov et al.
U.S. Appl. No. 15/971,325, filed May 4, 2018, Kucherov et al.

(56) References Cited

OTHER PUBLICATIONS

U.S. Appl. No. 15/971,310, filed May 4, 2018, Kucherov et al.
U.S. Appl. No. 15/971,153, filed May 4, 2018, Meiri et al.
U.S. Appl. No. 15/885,027, filed Jan. 31, 2018, Chen et al.
U.S. Appl. No. 15/797,329, filed Oct. 30, 2017, Parasnis et al.
U.S. Appl. No. 15/797,324, filed Oct. 30, 2017, Chen et al.
U.S. Appl. No. 15/656,170, filed Jul. 21, 2017, Chen et al.
U.S. Appl. No. 15/656,168, filed Jul. 21, 2017, Hu et al.
U.S. Appl. No. 15/499,951, filed Apr. 28, 2017, Chen et al.
U.S. Appl. No. 15/499,949, filed Apr. 28, 2017, Chen et al.
U.S. Appl. No. 15/499,947, filed Apr. 28, 2017, Kucherov et al.
U.S. Appl. No. 15/499,943, filed Apr. 28, 2017, Kucherov et al.
U.S. Appl. No. 15/499,935, filed Apr. 28, 2017, Chen et al.
U.S. Appl. No. 15/499,303, filed Apr. 27, 2017, Kucherov et al.
U.S. Appl. No. 15/499,297, filed Apr. 27, 2017, Kucherov et al.
U.S. Appl. No. 15/499,226, filed Apr. 27, 2017, Meiri et al.
U.S. Appl. No. 15/499,199, filed Apr. 27, 2017, Stronge et al.
U.S. Appl. No. 15/085,188, filed Mar. 30, 2016, Meiri et al.
U.S. Appl. No. 15/076,946, filed Mar. 22, 2016, Meiri.
U.S. Appl. No. 15/076,775, filed Mar. 22, 2016, Chen et al.
U.S. Appl. No. 15/001,789, filed Jan. 20, 2016, Meiri et al.

\* cited by examiner

TIME-TO-LIVE (TTL) LICENSE MANAGEMENT IN AN ACTIVE/ACTIVE REPLICATION SESSION

BACKGROUND

Data replication techniques enable organizations to protect data from loss, implement disaster recovery, or to migrate data between locations. There are various types of replication modes that can be utilized by an organization, and each mode comes with its own advantages and disadvantages. One popular mode of data replication is active/active replication in which a network of servers and applications concurrently perform input/output (IO) operations across a virtualized storage layer. This type of replication provides advantages such as continuous availability, as replication operations are not interrupted when one system or node in the network goes down.

However, an infrastructure that employs active/active replication requires some locking mechanism to enable concurrent updates to data from any site in the network. For example, if a host writes the first 4 KB of one page into one device and the last 4 KB of the same page into its peer device in an active/active setup, both sides will try to lock the page on both storage clusters, leading to a deadlock. Once a deadlock has been resolved, the system needs to maintain data consistency and ensure safe TO recovery when one or more components fails in the middle of locking and writing.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method for implementing time-to-live (TTL) license management in an active/active (A/A) replication session. The method includes assigning a first host system of the A/A replication session as a replication session manager. The replication session manager is tasked with performing A/A replication management functions. The A/A replication management functions include granting a TTL license to a first storage array and a second storage array, enabling input/output (IO) requests to the first storage array and the second storage array, from the first host system and a second host system, during a lifespan of the TTL license, renewing the TTL license for the first storage array and the second storage array prior to expiration of the TTL license, and upon determining an occurrence of a communication failure between the first storage array and the second storage array: selecting one of the first storage array and the second storage array as a winner and another of the first storage array and the second storage array as a loser, where the one of the first storage array and the second storage array designated as winner retains the TTL license; suspending the TTL license to the loser; and notifying the winner to suspend A/A replication activities to the loser. The method also includes monitoring, by the second host system, a communication connection between the first host system and the second host system. The second host system provides TO requests to the first storage array and the second storage array. Upon determining the communication connection has failed between the first host system and the second host system, the method includes reassigning the second host system as the replication session manager to take over the A/A replication management functions.

Another aspect may provide a system for implementing time-to-live (TTL) license management in an active/active (A/A) replication session. The system includes a memory having computer-executable instructions. The system also includes a processor operated by a storage system. The processor executes the computer-executable instructions. When executed by the processor, the computer-executable instructions cause the processor to perform operations. The operations include assigning a first host system of the A/A replication session as a replication session manager. The replication session manager is tasked with performing A/A replication management functions. The A/A replication management functions include granting a TTL license to a first storage array and a second storage array, enabling input/output (IO) requests to the first storage array and the second storage array, from the first host system and a second host system, during a lifespan of the TTL license, renewing the TTL license for the first storage array and the second storage array prior to expiration of the TTL license, and upon determining an occurrence of a communication failure between the first storage array and the second storage array: selecting one of the first storage array and the second storage array as a winner and another of the first storage array and the second storage array as a loser, where the one of the first storage array and the second storage array designated as winner retains the TTL license; suspending the TTL license to the loser; and notifying the winner to suspend A/A replication activities to the loser. The operations also include monitoring, by the second host system, a communication connection between the first host system and the second host system. The second host system provides TO requests to the first storage array and the second storage array. Upon determining the communication connection has failed between the first host system and the second host system, the operations include reassigning the second host system as the replication session manager to take over the A/A replication management functions.

Another aspect may provide a computer program product for implementing time-to-live (TTL) license management in an active/active (A/A) replication session. The computer program is embodied on a non-transitory computer readable medium. The computer program product includes instructions that, when executed by a computer at a storage system, causes the computer to perform operations. The operations include assigning a first host system of the A/A replication session as a replication session manager. The replication session manager is tasked with performing A/A replication management functions. The A/A replication management functions include granting a TTL license to a first storage array and a second storage array, providing input/output (IO) requests to the first storage array and the second storage array during a lifespan of the TTL license, renewing the TTL license for the first storage array and the second storage array prior to expiration of the TTL license, and upon determining an occurrence of a communication failure between the first storage array and the second storage array: selecting one of the first storage array and the second storage array as a winner and another of the first storage array and the second storage array as a loser, where the one of the first storage array and the second storage array designated as winner retains the TTL license; suspending the TTL license to the loser; and notifying the winner to suspend A/A replication activities to the loser. The operations also include monitoring, by a second host system, a communication connection between the first host system and the second host system. The second host system provides TO requests to the first storage array and the second storage array. Upon determining the communication connection has failed between the first host system and the second host system, the operations include reassigning the second host system as the replication session manager to take over the A/A replication management functions.

BRIEF DESCRIPTION OF THE DRAWINGS

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Figure 1:
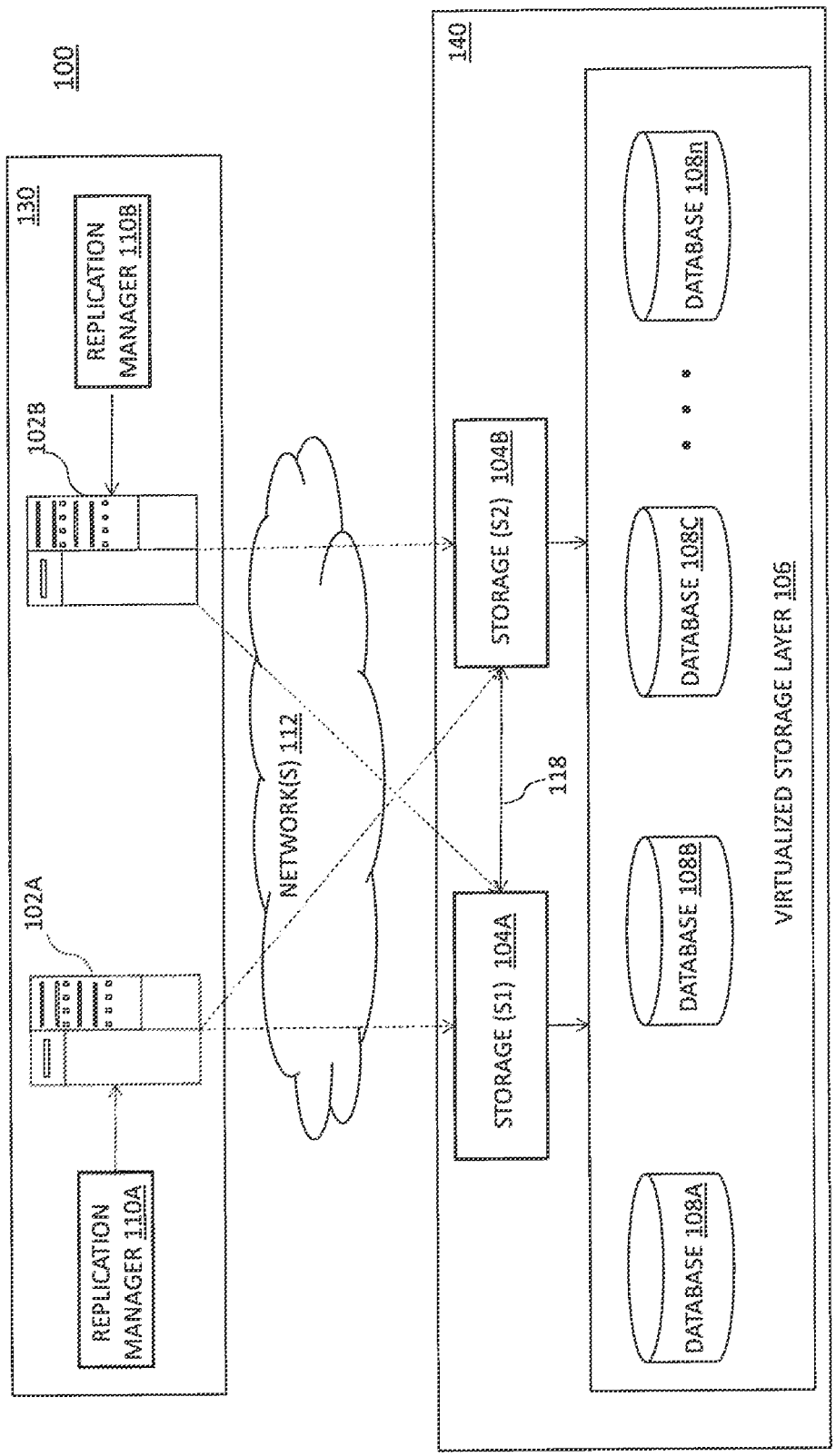
FIG. 1 is a block diagram of a storage system to perform time-to-live (TTL) license management in an active/active replication session in accordance with an illustrative embodiment.

Embodiments described herein provide time-to-live (TTL) license management in an active/active replication session. As indicated above, active/active replication refers to a mode of data replication in which a network of servers and applications concurrently perform input/output (IO) operations across a virtualized storage layer. This type of replication mode can create challenges, e.g., where a deadlock situation ensues when both sides of a replication system attempt to lock the same page at the same time. Techniques for resolving extent lock conflicts are disclosed in commonly assigned applications entitled "Extent Lock Resolution In Active/Active Replication," which is U.S. patent application Ser. No. 16/263,414, filed on Jan. 31, 2019, and "Consistent Input/Output (IO) Recovery for Active/Active Cluster Replication," which is U.S. patent application Ser. No. 16/264,825, filed on Feb. 1, 2019, the entire contents of both are incorporated herein by reference. The techniques described therein provide a solution for extent lock situations by designating one side of the storage network as a lock winner, giving that side of the network priority over locks and lock handling when both sides of the network simultaneously attempt to lock the same page during the active/active session. Once a deadlock has been resolved, a solution provides for maintenance of data consistency and to ensure safe IO recovery should one or more components fails in the middle of locking and writing.

The embodiments described herein enable the designation of a storage array as a winner and another storage array as a loser with regard to a TTL license. In addition, the embodiments enable the designation of a replication session manager role to one of the hosts engaged in the active/active replication session, which includes TTL license management functions and other features, as will be described herein.

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable and may also be referred to herein as a computer-readable program medium.

In certain embodiments, the term "I/O request" or simply "I/O" or "TO" may be used to refer to an input or output request, such as a data read or data write request.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives (e.g., the XtremIO all flash drive, available from DELL/EMC of Hopkinton Mass.). In certain embodiments, a data storage entity may be any one or more of a file system, object storage, a virtualized device, a logical unit, a logical unit number, a logical volume, a logical device, a physical device, and/or a storage medium.

In certain embodiments, a physical storage unit may be a physical entity, such as a disk or an array of disks, for storing data in storage locations that can be accessed by address, where physical storage unit is used interchangeably with physical volume. In certain embodiments, a data storage entity may be any one or more of a file system, object storage, a virtualized device, a logical unit, a logical unit number, a logical volume, a logical device, a physical device, and/or a storage medium.

In certain embodiments, a snapshot may refer to differential representations of an image, i.e. the snapshot may have pointers to the original volume and may point to log volumes for changed locations. In certain embodiments, a snapshot may refer to differential representations of the state of a system. Snapshots may be combined into a snapshot array, which may represent different images over a time period or different states of a system over a time period.

In certain embodiments, a journal may be a record of write transactions (e.g., I/O data) issued to a storage system, which may be used to maintain a duplicate storage system, and to roll back the duplicate storage system to a previous point in time. In some embodiments, each entry in a journal contains, apart from the I/O data itself, I/O metadata that can include information such as a volume identifier (ID), the I/O block offset within the volume, the I/O length, and a timestamp of the I/O.

In certain embodiments, a data protection strategy that can be advantageous for use with computer systems, especially networked storage systems, is checkpointing. A checkpoint, as used herein, contains a consistent point in time image of an entire system, including configuration, logical volume mapping metadata, physical on disk layout metadata, and actual user data. In certain embodiments, a checkpoint preserves the state of a system at a given point in time by saving one or more snapshots of, for example, a file system, or an application at one or more points in time. A checkpoint can preserve a snapshot of an application's state, so that it can restart from that point in case of failure, which can be useful for long running applications that are executed in failure-prone computing systems. If a checkpoint is used, an application periodically writes large volumes of snapshot data to persistent storage in an attempt to capture its current state. Thus, if there is a failure, the application can recover by rolling-back its execution state to a previously saved checkpoint.

In certain embodiments, active/active replication refers to a mode of data replication in which a network of servers and applications concurrently perform input/output (IO) operations across a virtualized storage layer. This type of replication provides advantages such as continuous availability, as replication operations are not interrupted when one system or node in the network goes down.

In certain embodiments, an extent refers to a contiguous area of storage reserved for a file system that is represented as a range of blocks. For example, a file may consist of zero or more extents and one file fragment would require one extent.

In certain embodiments, a storage cluster may refer to a type of configuration that enables stretched clusters (e.g., clusters distributed across different geographic locations). Storage cluster configurations enable entities to provide load balancing and migrations between data centers.

In certain embodiments, a TTL license refers to a component of clustering algorithms where one entity grants a second entity a license to be part of the cluster for a limited amount of time. The license is valid as long as the TTL timer has not expired. Once the timer expires, the second entity is considered evicted from the cluster, unless another TTL grant extends the timer.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants are not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

Turning now to FIG. 1, an example storage system 100 for performing time-to-live (TTL) license management in an active/active replication session will now be described. As indicated above, active/active replication refers to a mode of data replication in which a network of servers and applications concurrently perform input/output (IO) operations across a virtualized storage layer.

The system 100 includes a first host system computer 102A and a second host system computer 102B. Each of the host system computers 102A and 102B is communicatively coupled to storage systems (S1) 104A and (S2) 104B over one or more networks 112. The storage systems 104A and 104B may be storage arrays. The host system computers 102A and 102B may be implemented as high-speed computer processing devices, such as one or more mainframe computers capable of handling a high volume of activities conducted on behalf of end users of the active/active replication session.

The storage systems 104A and 104B store a variety of data used by the host system computers 102A and 102B in implementing the active/active replication session. It is understood that the storage systems 104A and 104B may be implemented using memory contained in their respective host system computers 102A and 102B or may be separate physical devices. The storage systems 104A and 104B may be logically addressable as consolidated data sources across a distributed environment that includes the networks 112.

The storage systems 104A-104B may communicate over a replication link 118 to perform replication write operations. For example, in embodiments, storage system 104A receives a write IO request from host system computer 102A and, once the write operation has been completed on the storage system 104A, the write IO is replicated to the storage system 104B over the replication link 118. It is understood that other means of communication between the storage systems 104A-104B may be employed, e.g., through one or more networks of networks 112.

The host system computers 102A-102B may operate as database servers and coordinate access to application data including data stored in the storage systems 104A and 104B. The host system computers 102A-102B may be implemented using one or more servers operating in response to a computer program stored in a storage medium accessible by the servers. The host system computers 102A-102B may each operate as a network server (e.g., a web server) to communicate with any network entities, such as storage systems 104A and 104B.

Storage systems 104A and 104B may be implemented as varying types of storage devices. For example, the storage systems 104A and 104B may include one or more rotating magnetic storage devices, one or more rotating optical storage devices, and/or one or more solid state drives (SSDs), such as a flash drive. The storage systems 104A and 104B may include one or more hard disk drives (HDD), one or more flash drives, optical disks, as well as one or more other types of data storage devices. In other examples, the storage systems 104A and 104B may include a set of one or more data storage arrays. A data storage array may be, for example, a redundant array of inexpensive disks (RAID) array, an optical storage array, or any other type of data storage array.

The networks 112 may be any type of known networks including, but not limited to, a storage area network (SAN), wide area network (WAN), a local area network (LAN), a global network (e.g. Internet), a virtual private network (VPN), and an intranet. The networks 112 may be implemented using wireless networks or any kind of physical network implementation known in the art, e.g., using cellular, satellite, and/or terrestrial network technologies. The networks 112 may also include short range wireless networks utilizing, e.g., BLUETOOTH™ and WI-FI™ technologies and protocols.

Host system computer 102A and host system computer 102B may reside in the same data center (e.g., shown generally in FIG. 1 as data center 130) or may reside in separate data centers. Likewise, storage system 104A and storage system 104B may reside in the same data center (e.g., shown generally in FIG. 1 as data center 140) or may reside in different data centers. However, the host system computers 102A and 102B may not reside in the same data center as the storage systems 104A-104B. In this manner, a site failure impacting storage system 104A or 104B will not automatically shut down the host system computer 102A or host system computer 102B.

In one embodiment, the host system computer 102A may be co-located with host system computer 102B but not on the same physical server. For example, host system computers 102A and 102B may be virtual machines on separate servers in the same data center, e.g., 130.

Host system computers 102A and 102B each communicate with storage systems 104A and 104B over network(s) 112.

Also shown in FIG. 1 is a virtualized storage layer 106 including virtual databases 108A-108n. The virtualized storage layer 106 represents a storage array virtualized across two or more physical sites to create a data presence mirrored between the sites and enables simultaneous writes to the two or more sites. The databases 108A-108n may reside in one or more of the storage systems 104A-104B. The virtualized storage layer 106 is communicatively coupled to the host systems 102A-102B through the storage systems 104A-104B via the networks 112.

Figure 2:
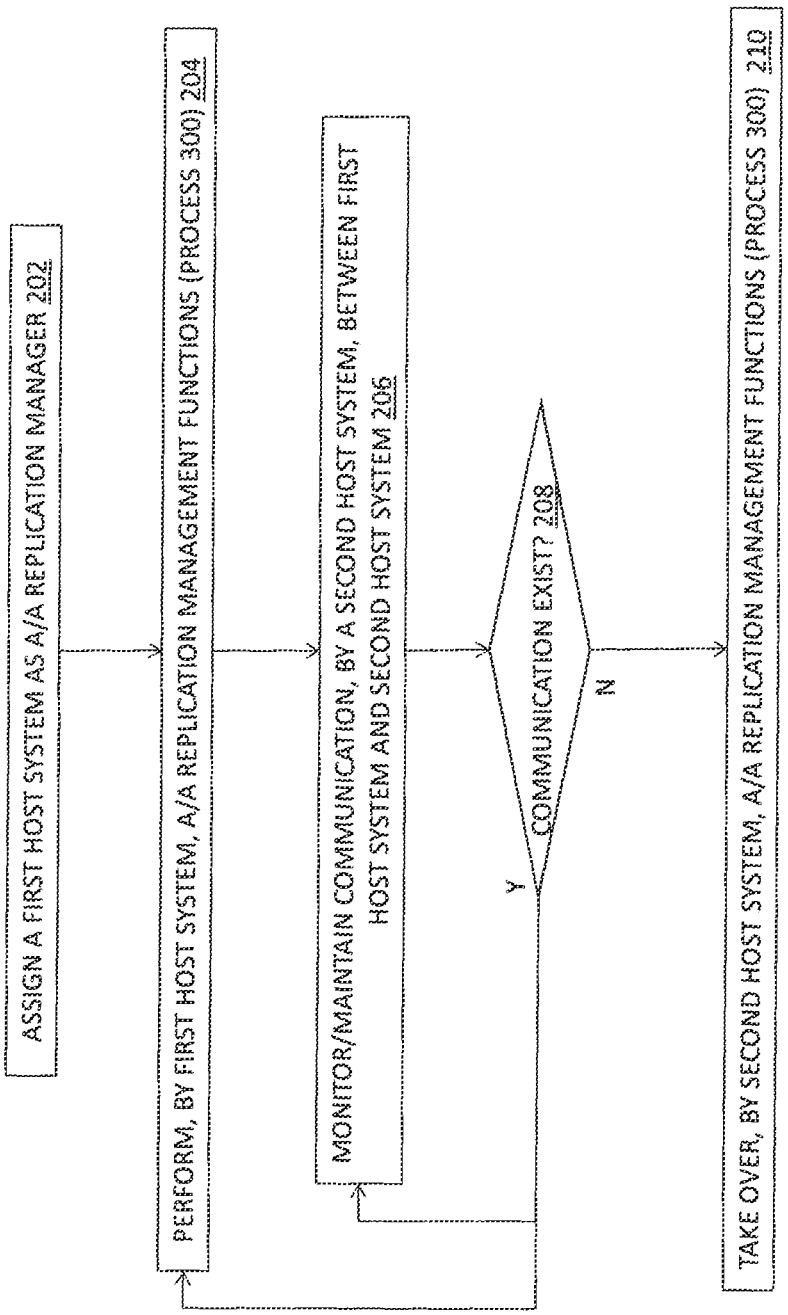
FIG. 2 is a flow diagram of a process for performing time-to-live (TTL) license management in an active/active replication session.
Figure 3:
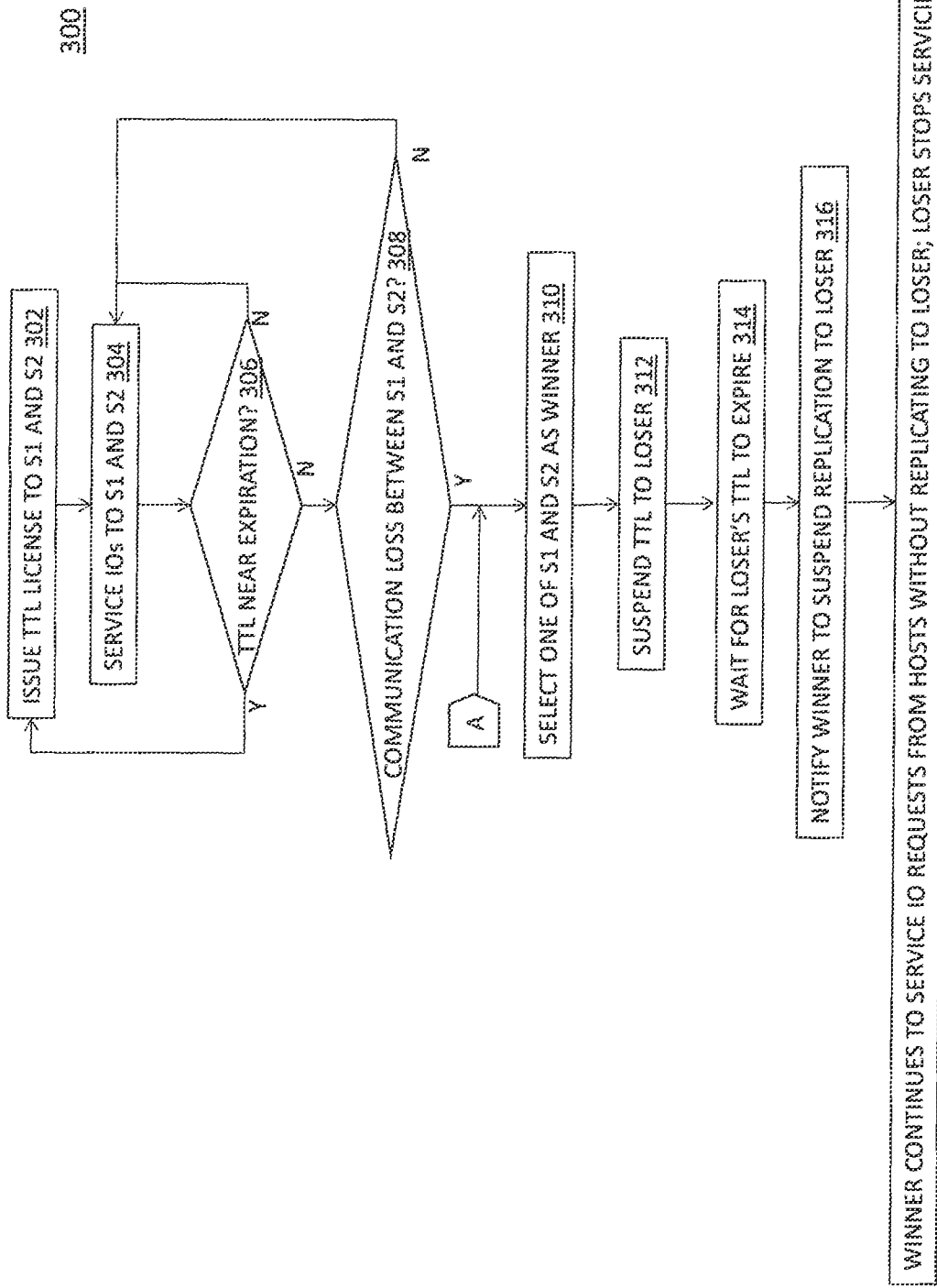
FIG. 3 is a flow diagram of a process for performing replication session management functions in accordance with the process of FIG. 2, in accordance with an illustrative embodiment.
Figure 4:
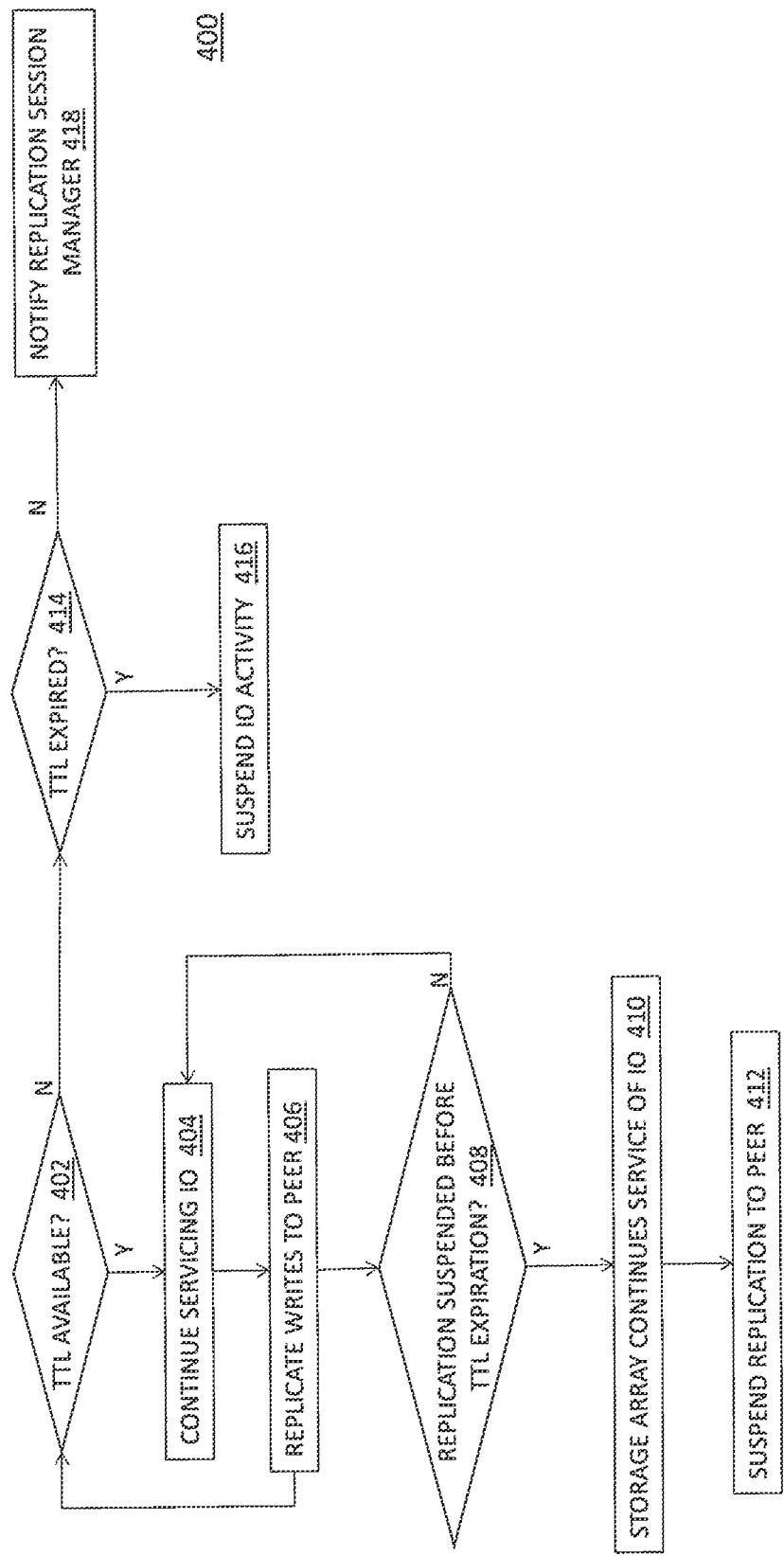
FIG. 4 is a flow diagram of a process performed by storage systems of the active/active replication session in accordance with an embodiment.

In embodiments, as shown in FIG. 1, the host system computer 102A and the host system computer 102B each implements a replication manager application 110A and 110B, respectively, to manage the processes described, e.g., in FIGS. 2-4 herein. The host system computers 102A and 102B perform IO operations on the storage systems 104A and 104B in an active/active replication session. In some embodiments, the IO operations for each of the host system computers 102A and 102B may be managed through the respective replication manager applications 110A and 110B. As changes are made to data stored on storage systems 104A and 104B via the IO operations from the host system computers 102A and 102B, the host system computers 102A and 102B perform data replication to their local storage systems and to remote storage systems over the networks 112 in an active/active replication mode.

Data replication may be performed based on data replication policies that may define various settings for data recovery operations. For example, one policy may define a plurality of attributes, such as a frequency with which replicas are generated and how long each replica is kept at a storage system. In some embodiments, a policy may define metrics for use in snap set creation and replication process determinations.

In embodiments, replication manager applications 110A and 110B, through the host systems 102A and 102B, are configured to receive a designation, or reassignment, of a replication session manager role that provides A/A replication management functions. This role assignment and management functions are described further in FIGS. 2-4. In an embodiment, this designation can be determined a third-party system or individual, or by criteria such as a serial number of the host system computers. For example, the serial numbers of the host system computers 102A and 102B can be compared and, through the replication manager applications 110A and 110B, the serial number having the highest value may be determined as the designated replication session manager. In an embodiment, a user or administrator at one of the data centers can designate which host system computer will perform the role of the replication session manager.

Turning now to FIG. 2, a flow diagram of a process 200 for implementing time-to-live (TTL) license management in an active/active replication session will now be described. The process 200 of FIG. 2 assumes that the system (e.g., system 100 of FIG. 1) is performing replication in an A/A replication mode. The process 200 also assumes that both host system computers 102A and 102B are in communication with each other.

In block 202, a first host system computer is designated as the replication session manager. The replication session manager is tasked with performing A/A replication management functions. In block 204, the first host system computer performs the A/A replication management functions, which are described in FIG. 3. In block 206, a second host system computer continuously monitors whether it is in communication with the first host system computer. This step is performed throughout the processes described in FIGS. 2-4. In addition, the second host system computer provides IO requests to the first storage array and the second storage array as part of the A/A replication session.

If the communication with the first host system computer is maintained (block 208), e.g., a heartbeat exists, the process returns to block 204, where the first host system computer (as replication session manager) continues performing the A/A replication management functions.

If, however, the communication is lost between the first and second host system computers in block 208, the second host system computer takes over as the replication session manager in block 210 to perform the A/A replication management functions, as described in FIG. 3.

Turning now to FIG. 3, the A/A replication management functions will now be described. As indicated above, a first host system computer is initially designated as the replication session manager to perform the process 300 of FIG. 3 (block 202 of FIG. 2). However, if at any time, communication is lost between the first and second host system computers, the second host system computer will take over this assignment and perform the functions (block 210 of FIG. 2). Thus, the host system computer performing the process 300 of FIG. 3 may be either of the first host system computer (e.g., host system computer 102A) or the second host system computer (e.g., host system computer 102B).

In block 302, the replication session manager grants a TTL to the first storage array and the second storage array. In block 304, the hosts provide IO requests to the first and second storage arrays as part of an A/A replication session. The IO requests are provided to the storage arrays pursuant to the TTL license lifespan. The storage arrays are now allowed to service IO requests from the hosts and any write requests to one storage array are replicated to its peer array.

In block 306, it is determined whether the TTL license is near expiration. If not, the process returns to block 304 and the IO requests continue to the storage arrays. Otherwise, if the TTL license is near expiration, the replication session manager renews the TTL license in block 302, and the process continues to block 304.

In addition, if the TTL license is not near expiration in block 306, in block 308, it is determined whether a communication failure has occurred between the storage arrays. If not, the process 300 returns to block 304 in which the replication session manager continues to service IO requests to the storage arrays. However, in block 308, if a communication failure has occurred, the replication session manager selects one of the storage arrays to be a winner with respect to the TTL license in block 310. The winner indicates that a TTL license will be maintained for that storage array. In block 312, the replication session manager suspends the TTL license for the losing storage array and waits for the losing storage array's TTL to run out of time in block 314.

Once the losing storage array runs out of time, the replication session manager notifies the winning storage array to suspend replication to the losing storage array in block 316. In block 318, the winning storage array continues to service IO requests from hosts without replicating data to the losing storage array.

Turning now to FIG. 4, a process 400 performed by storage systems pursuant to the A/A replication management functions will now be described. The process 400 of FIG. 4 assumes that the A/A replication management functions of process 400 have been implemented, at least in part.

In block 402, it is determined by the storage arrays whether a TTL license is available. This means that the TTL license has been issued and has not expired. In block 404, if the TTL license is available, the storage arrays continue servicing IO requests received from host system computers. The storage arrays replicate writes to peer storage devices in block 406. (e.g., storage array 104A replicates to storage array 104B and vice versa).

In block 408, it is determined whether replication has been suspended prior to expiration of the TTL license. This may occur when communication has been lost between the storage arrays (e.g., as described in block 308 of FIG. 3). If the replication has not been suspended in block 408, the process 400 returns to block 404 and the IO servicing continues. However, if the replication has been suspended before the TTL license has expired, the storage array allows host IO servicing to proceed in block 410 and suspends replication of data to the corresponding peer system in block 412.

Returning to block 402 above, if the TTL license is not available, it is determined whether the TTL license has expired in block 414 (the system may wish to allow the TTL to expire, e.g., in the case where the links between the two storage arrays is down but also in the case the user wants to move from active/active replication to work with a single storage array with no replication). If the TTL license has expired, all IO servicing is suspended indefinitely in block 416. If the TTL license has not expired in block 414 (but is also not available in block 402), the storage arrays notify the replication session manager in block 418. This means that replication is not possible (e.g., the links are down) between the storage arrays.

Figure 5:
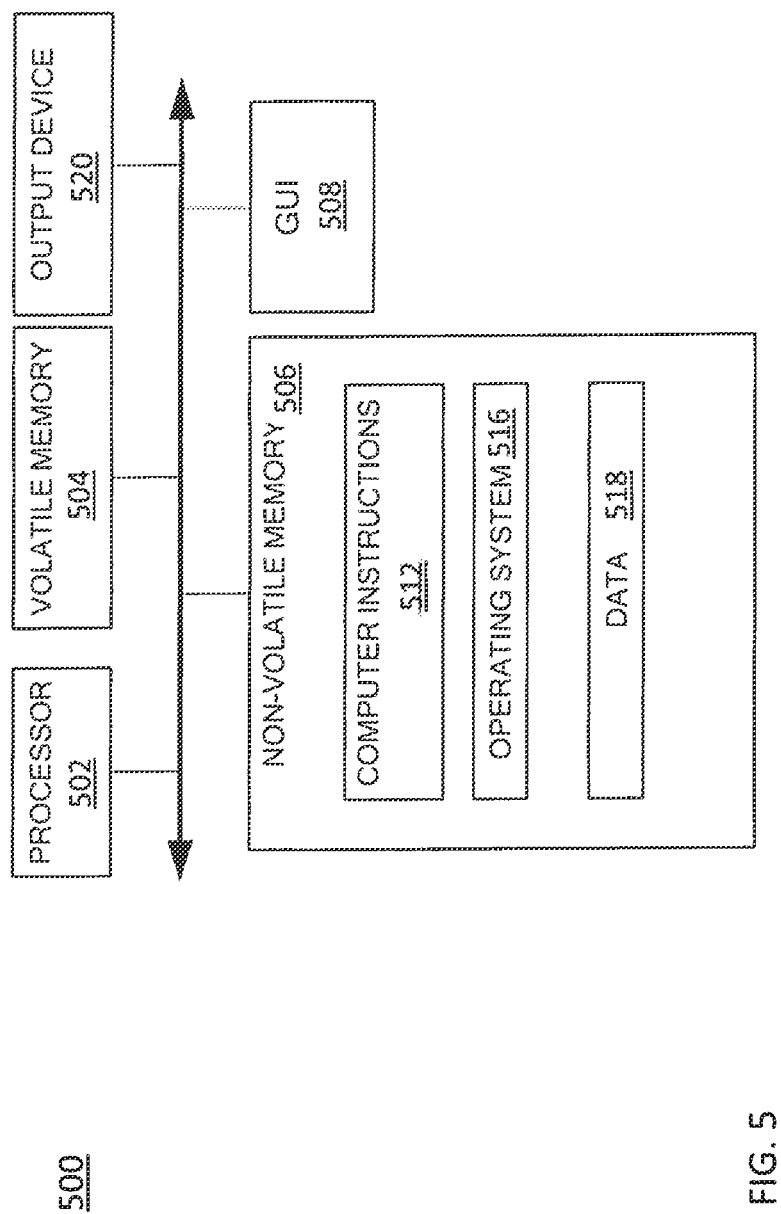
FIG. 5 is a block diagram of a hardware device that may perform at least a portion of the processes shown in FIGS. 2-4.

In some embodiments, the host system computers 102A-102B may be implemented as one or more computers, such as a computer 500 as shown in FIG. 5. Computer 500 may include processor 502, volatile memory 504 (e.g., RAM), non-volatile memory 506 (e.g., a hard disk drive, solid state drive such as a flash drive, a hybrid magnetic and solid state drive, etc.), graphical user interface (GUI) 508 (e.g., a mouse, a keyboard, a display, and so forth) and input/output (I/O) device 520. Non-volatile memory 506 stores computer instructions 512, an operating system 516 and data 518 such that, for example, the computer instructions 512 are executed by the processor 502 out of volatile memory 504 to perform at least a portion of the processes 200-400 shown in FIGS. 2-4. Program code may be applied to data entered using an input device of GUI 508 or received from I/O device 520.

Processes 200-400 shown in FIGS. 2-4 are not limited to use with the hardware and software of FIG. 5 and may find applicability in any computing or processing environment and with any type of machine or set of machines that is capable of running a computer program. Processes 200-400 may be implemented in hardware, software, or a combination of the two.

The processes described herein are not limited to the specific embodiments described. For example, processes 200-400 are not limited to the specific processing order shown in FIGS. 2-4. Rather, one or more blocks of processes 200-400 may be re-ordered, combined or removed, performed in parallel or in serial, as necessary, to achieve the results set forth herein.

Processor 502 may be implemented by one or more programmable processors executing one or more computer programs to perform the functions of the system. As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC). In some embodiments, the "processor" can be embodied in a microprocessor with associated program memory. In some embodiments, the "processor" can be embodied in a discrete electronic circuit. The "processor" can be analog, digital or mixed-signal.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general-purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

In the above-described flow charts of FIG. 2-4, rectangular elements, herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagram does not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Figure 6:
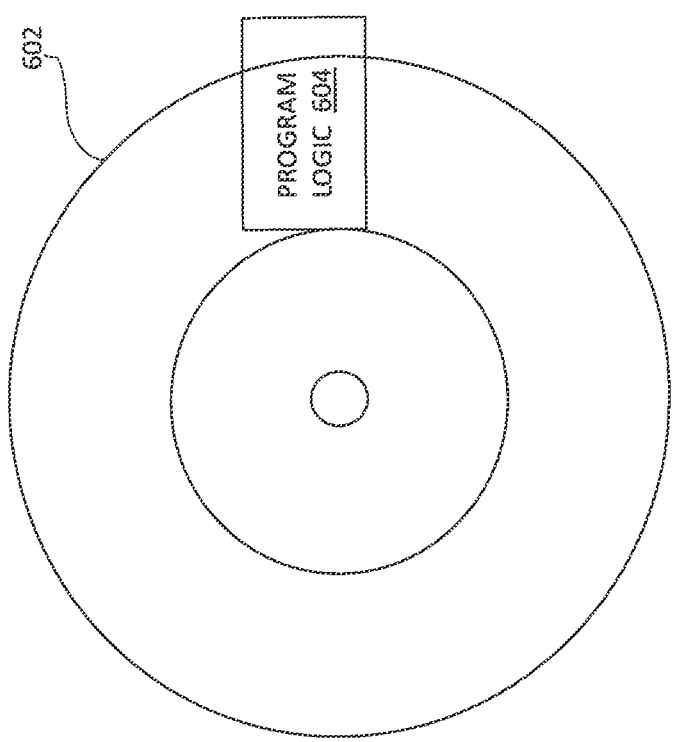
FIG. 6 is a simplified block diagram of an apparatus that may be used to implement at least a portion of the systems of FIGS. 1 and 5 and at least a portion of the processes of FIGS. 2-4.

For example, when the program code is loaded into and executed by a machine, such as the computer of FIG. 5, the machine becomes an apparatus for practicing the invention. When implemented on one or more general-purpose processors, the program code combines with such a processor to provide a unique apparatus that operates analogously to specific logic circuits. As such a general-purpose digital machine can be transformed into a special purpose digital machine. FIG. 6 shows Program Logic 604 embodied on a computer-readable medium 602 as shown, and wherein the Logic is encoded in computer-executable code configured for carrying out the reservation service process of this invention and thereby forming a Computer Program Product 600. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, logic may be executed across one or more physical or virtual processors.

For purposes of illustrating the present embodiment, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

What is claimed is:

1. A method for implementing time-to-live (TTL) license management in an active/active (A/A) replication session, the method comprising:
    assigning a first host system of the A/A replication session as a replication session manager, the replication session manager tasked with performing A/A replication management functions, comprising:
        granting a TTL license to a first storage array and a second storage array;
        enabling input/output (IO) requests to the first storage array and the second storage array, from the first host system and a second host system, during a lifespan of the TTL license;
        renewing the TTL license for the first storage array and the second storage array prior to expiration of the TTL license;
        upon determining an occurrence of a communication failure between the first storage array and the second storage array:
            selecting one of the first storage array and the second storage array as a winner and another of the first storage array and the second storage array as a loser, the one of the first storage array and the second storage array designated as winner retains the TTL license;
            suspending the TTL license to the loser; and
            notifying the winner to suspend A/A replication activities to the loser;
    monitoring, by the second host system, a communication connection between the first host system and the second host system, the second host system providing IO requests to the first storage array and the second storage array; and
    upon determining the communication connection has failed between the first host system and the second host system, reassigning the second host system as the replication session manager to take over the A/A replication management functions.

2. The method of claim 1, further comprising:
    upon determining by the first storage array and the second storage array that the TTL license is available, servicing the IO requests received from the first host system and the second host system.

3. The method of claim 2, further comprising:
    upon determining replication has been suspended prior to expiration of the TTL license, suspending, by the first storage array and the second storage array, the A/A replication session and continuing servicing IO requests from the first host system and the second host system.

4. The method of claim 1, further comprising:
    upon determining, by the first storage array and the second storage array that the TTL license is not available, and upon determining the TTL license has expired, suspending, by the first storage array and the second storage array, all IO activity.

5. The method of claim 1, further comprising:
    upon determining, by the first storage array and the second storage array that the TTL license is not available, and upon determining the TTL license has not expired, sending by the first storage array and the second storage array a notification to the replication session manager.

6. The method of claim 1, wherein upon determining the occurrence of a communication failure between the first storage array and the second storage array, the method further comprises upon determining the TTL license of the loser is expired, enabling the winner to continue servicing IO requests without replicating to the loser.

7. The method of claim 1, wherein the first host system and the second host system are not co-located with the first storage array and the second storage array.

8. A system for implementing time-to-live (TTL) license management in an active/active (A/A) replication session, the system comprising:
    a memory comprising computer-executable instructions; and
    a processor executing the computer-executable instructions, the computer-executable instructions when executed by the processor cause the processor to perform operations comprising:
    assigning a first host system of the A/A replication session as a replication session manager, the replication session manager tasked with performing A/A replication management functions, comprising:
        granting a TTL license to a first storage array and a second storage array;
        enabling input/output (IO) requests to the first storage array and the second storage array, from the first host system and a second host system, during a lifespan of the TTL license;
        renewing the TTL license for the first storage array and the second storage array prior to expiration of the TTL license;
        upon determining an occurrence of a communication failure between the first storage array and the second storage array:
            selecting one of the first storage array and the second storage array as a winner and another of the first storage array and the second storage array as a loser, the one of the first storage array and the second storage array designated as winner retains the TTL license;
            suspending the TTL license to the loser; and
            notifying the winner to suspend A/A replication activities to the loser;
    monitoring, by the second host system, a communication connection between the first host system and the second host system, the second host system providing IO requests to the first storage array and the second storage array; and upon determining the communication connection has failed between the first host system and the second host system, reassigning the second host system as the replication session manager to take over the A/A replication management functions.

9. The system of claim 8, wherein the operations further comprise:

upon determining by the first storage array and the second storage array that the TTL license is available, servicing the IO requests received from the first host system and the second host system.

10. The system of claim 9, wherein the operations further comprise:

upon determining replication has been suspended prior to expiration of the TTL license, suspending, by the first storage array and the second storage array, the A/A replication session and continuing servicing TO requests from the first host system and the second host system.

11. The system of claim 8, wherein the operations further comprise:

upon determining, by the first storage array and the second storage array that the TTL license is not available, and upon determining the TTL license has expired, suspending, by the first storage array and the second storage array, all TO activity.

12. The system of claim 8, wherein the operations further comprise:

upon determining, by the first storage array and the second storage array that the TTL license is not available, and upon determining the TTL license has not expired, sending by the first storage array and the second storage array a notification to the replication session manager.

13. The system of claim 8, wherein upon determining the occurrence of a communication failure between the first storage array and the second storage array, the operations further comprise upon determining the TTL license of loser is expired, enabling the winner to continue servicing TO requests without replicating to the loser.

14. The system of claim 8, wherein the first host system and the second host system are not co-located with the first storage array and the second storage array.

15. A computer program product for implementing time-to-live (TTL) license management in an active/active (A/A) replication session, the computer program product embodied on a non-transitory computer readable medium and including instructions that, when executed by a computer causes the computer to perform operations comprising:

assigning a first host system of the A/A replication session as a replication session manager, the replication session manager tasked with performing A/A replication management functions, comprising:

granting a TTL license to a first storage array and a second storage array;

input/output (IO) requests to the first storage array and the second storage array during a lifespan of the TTL license;

renewing the TTL license for the first storage array and the second storage array prior to expiration of the TTL license;

upon determining an occurrence of a communication failure between the first storage array and the second storage array:

selecting one of the first storage array and the second storage array as a winner and another of the first storage array and the second storage array as a loser, the one of the first storage array and the second storage array designated as winner retains the TTL license;

suspending the TTL license to the loser; and notifying the winner to suspend A/A replication activities to the loser;

monitoring, by a second host system, a communication connection between the first host system and the second host system, the second host system providing IO requests to the first storage array and the second storage array; and upon determining the communication connection has failed between the first host system and the second host system, reassigning the second host system as the replication session manager to take over the A/A replication management functions.

16. The computer program product of claim 15, wherein the operations further comprise:

upon determining by the first storage array and the second storage array that the TTL license is available, servicing the IO requests received from the replication session manager.

17. The computer program product of claim 16, wherein the operations further comprise:

upon determining replication has been suspended prior to expiration of the TTL license, suspending, by the first storage array and the second storage array, the A/A replication session and continuing servicing IO requests from the replication session manager.

18. The computer program product of claim 15, wherein the operations further comprise:

upon determining, by the first storage array and the second storage array that the TTL license is not available, and upon determining the TTL license has expired, suspending, by the first storage array and the second storage array, all IO activity.

19. The computer program product of claim 15, wherein the operations further comprise:

upon determining, by the first storage array and the second storage array that the TTL license is not available, and upon determining the TTL license has not expired, sending by the first storage array and the second storage array a notification to the replication session manager.

20. The computer program product of claim 15, wherein upon determining the occurrence of a communication failure between the first storage array and the second storage array, the operations further comprise upon determining the loser is dead.

* * * * *